(12) United States Patent
Bahl et al.

(10) Patent No.: US 9,236,955 B2
(45) Date of Patent: Jan. 12, 2016

(54) RECONFIGURABLE ANTENNAS FOR PERFORMANCE ENHANCEMENT OF INTERFERENCE NETWORKS EMPLOYING INTERFERENCE ALIGNMENT

(71) Applicants: Drexel University, Philadelphia, PA (US); The Trustees of The University of Pennsylvania, Philadelphia, PA (US)

(72) Inventors: Rohit Bahl, Philadelphia, PA (US); Nikhil Gulati, Philadelphia, PA (US); Kapil R. Dandekar, Philadelphia, PA (US); Dwight L. Jaggard, Philadelphia, PA (US)

(73) Assignees: Drexel University, Philadelphia, PA (US); The Trustees Of The University Of Pennsylvania, Philadelphia, PA (US)

( * ) Notice: Subject to any disclaimer, the term of this patent is extended or adjusted under 35 U.S.C. 154(b) by 0 days.

(21) Appl. No.: 14/408,807

(22) PCT Filed: Jun. 19, 2013

(86) PCT No.: PCT/US2013/046468
§ 371 (c)(1),
(2) Date: Dec. 17, 2014

(87) PCT Pub. No.: WO2013/192265
PCT Pub. Date: Dec. 27, 2013

(65) Prior Publication Data
US 2015/0195047 A1   Jul. 9, 2015

Related U.S. Application Data

(60) Provisional application No. 61/662,109, filed on Jun. 20, 2012.

(51) Int. Cl.
*H04L 1/02* (2006.01)
*H04B 15/00* (2006.01)
(Continued)

(52) U.S. Cl.
CPC .............. *H04B 15/00* (2013.01); *H04B 7/0452* (2013.01); *H04B 7/0456* (2013.01); *H04B 7/0617* (2013.01); *H04L 27/2601* (2013.01)

(58) Field of Classification Search
CPC ................................. H04L 1/0618; H04L 1/06
USPC .................... 375/267, 285, 346; 343/816, 853
See application file for complete search history.

(56) References Cited

U.S. PATENT DOCUMENTS

2009/0309802 A1 * 12/2009 Lindgren ...................... 343/816
2011/0310994 A1    12/2011 Ko et al.
(Continued)

FOREIGN PATENT DOCUMENTS

WO          2009/132601    * 11/2009
WO     WO 2009-132601      11/2009
(Continued)

OTHER PUBLICATIONS

Blum, "MIMO Capacity With Interference," Selected Areas in Communications, IEEE Journal on, 2003, 21(5), 793-801.
(Continued)

*Primary Examiner* — Khai Tran
(74) *Attorney, Agent, or Firm* — Baker & Hostetler LLP (57) ABSTRACT

By using reconfigurable antenna based pattern diversity, an optimal channel can be realized in order to maximize the distance between two subspaces, thereby increasing sum-rate. The inventors show the benefits of pattern reconfigurability using real-world channels, measured in a MIMO-OFDM interference network. The results are quantified with two different reconfigurable antenna architectures. An additional 47% gain in choral distance and 45% gain in sum capacity were achieved by exploiting pattern diversity with IA. Due to optimal channel selection, the performance of IA can also be improved in a low SNR regime.

10 Claims, 5 Drawing Sheets

(51) Int. Cl.
    H04B 7/04    (2006.01)
    H04B 7/06    (2006.01)
    H04L 27/26   (2006.01)

(56) References Cited

U.S. PATENT DOCUMENTS

2012/0307929 A1* 12/2012 Seo et al. .............. 375/267
2013/0208608 A1*  8/2013 Piazza et al. ........... 370/252

FOREIGN PATENT DOCUMENTS

WO   WO 2011-096747    8/2011
WO   WO 2011-116289    9/2011
WO   WO 2013-192265   12/2013

OTHER PUBLICATIONS

Boerman, J. and Bernhard, J., "Performance Study of Pattern Reconfigurable Antennas in MIMO Communication Systems," Antennas and Propagation, IEEE Transactions on Jan. 2008, 56(1), 231-236.

Cadambe, V. and Jafar, S., "Interference Alignment and Degrees of Freedom of the User Interference Channel", Information theory, IEEE transactions, Aug. 2008, 54(8), 3425-3441.

Cetiner et al, "Multifunctional Reconfigurable MEMS Integrated Antennas for Adaptive MIMO Systems," Communications Magazine, IEEE, Dec. 2004, 42(12), 62-70.

El Ayach et al, "The Feasibility of Interference Alignment Over Measured MIMO-OFDM Channels," Vehicular Technology, IEEE Transactions on Sep. 2010, 59(9), 4309-4321.

Gonzalez et al, "Experimental Validation of Interference Alignment Techniques Using a Multiuser MIMO Testbed," in Smart Antennas (WSA), 2011 International ITG Workshop on IEEE, 2011, pp. 1-8.

Gulati et al, "Learning Algorithm for Reconfigurable Antenna State Selection," in IEEE Radio and Wireless Symposium, 2012, IEEE, 31-34.

Kountouriotis et al, "Reconfigurable Antennas and Configuration Selection Methods for MIMO ad hoc Networks," EURASIP Journal on Wireless Communications and Networking, 2011, 147, 1-14, Published Online: Oct. 31, 2011.

Love, D. and Heath, R., "Limited Feedback Unitary Precoding for Spatial Multiplexing Systems," Information Theory, IEEE Transactions on, Aug. 2005, 51(8), 2967-2976.

Mandke et al, "Early Results on HYDRA: A Flexible Mac/Phy Multihop Testbed," in Vehicular Technology Conference, 2007 VTC2007-Spring. IEEE 65th. IEEE, 2007, pp. 1896-1900.

Piazza et al, "A Technique for Antenna Configuration Selection for Reconfigurable Circular Patch Arrays," Wireless Communications, IEEE Transactions on 2009, , 8(3), 1456-1467.

Piazza et al, "Design and Evaluation of a Reconfigurable Antenna Array for MIMO Systems," Antennas and Propagation, IEEE Transactions on Mar. 2008, 56(3), 869-881.

Piazza et al, "Experimental Analysis of Pattern and Polarization Reconfigurable Circular Patch Antennas for MIMO Systems," Vehicular Technology, IEEE Transactions on Feb. 17, 2010, 59(5), 2352-2362.

Razaviyayn et al, "Linear Transceiver Design for Interference Alignment: Complexity and Computation," in Signal Processing Advances in Wireless Communications (SPAWC), 2010 IEEE Eleventh International Workshop on. IEEE, 2010, 1-5.

Sayeed, A. and Raghavan, V., "Maximizing MIMO Capacity in Sparse Multipath With Reconfigurable Antenna Arrays," Selected Topics in Signal Processing, IEEE Journal of, 2007, 1(1),156-166.

Sung et al, "Linear Precoder Designs forK-User Interference Channels," Wireless Communications, IEEE Transactions on, 2010, 9(1), 291-301.

Yetis et al, "On Feasibility of Interference Alignment in MIMO Interference Networks," Signal Processing, IEEE Transactions on, 2010, 58(9), 4771-4782.

* cited by examiner

RECONFIGURABLE ANTENNAS FOR PERFORMANCE ENHANCEMENT OF INTERFERENCE NETWORKS EMPLOYING INTERFERENCE ALIGNMENT

CROSS-REFERENCE TO RELATED APPLICATIONS

This application is the National Stage of International Application No. PCT/US2013/046468, filed Jun. 19, 2013, which claims the benefit of U.S. Provisional Application No. 61/662,109, filed Jun. 20, 2012, the disclosures of which are incorporated herein by reference in their entireties.

STATEMENT OF FEDERALLY SPONSORED RESEARCH

The invention was made with government support under Grant No. 0916480 awarded by the National Science Foundation. The Government has certain rights in the invention.

TECHNICAL FIELD

The invention relates to multi-user wireless networks and, more particularly, to multi-user wireless networks that implement interference alignment algorithms using reconfigurable antenna based pattern diversity to maximize the distance between interference and desired signal space, thereby increasing sum-rate, even in low signal-to-noise ratio environments.

BACKGROUND

Interference management in multi-user wireless networks is a critical problem that needs to be addressed for enhancing network capacity. Cadambe and Jafar in V. Cadambe and S. Jafar, "Interference alignment and degrees of freedom of the-user interference channel," Information Theory, IEEE Transactions on, vol. 54, no. 8, pp. 3425-3441, 2008, made an important advancement in this direction by proving that the sum capacity of a multi-user network is not fundamentally limited by the amount of interference. In contrast with the traditional view, the number of interference free signaling dimensions, referred to as Degrees of Freedom (DoF), were shown to scale linearly with the number of users. Subsequently, they proposed Interference Alignment (IA) based precoding to achieve linear scaling of DoF and sum capacity in the high signal-to-noise ratio (SNR) regime.

Figure 1:
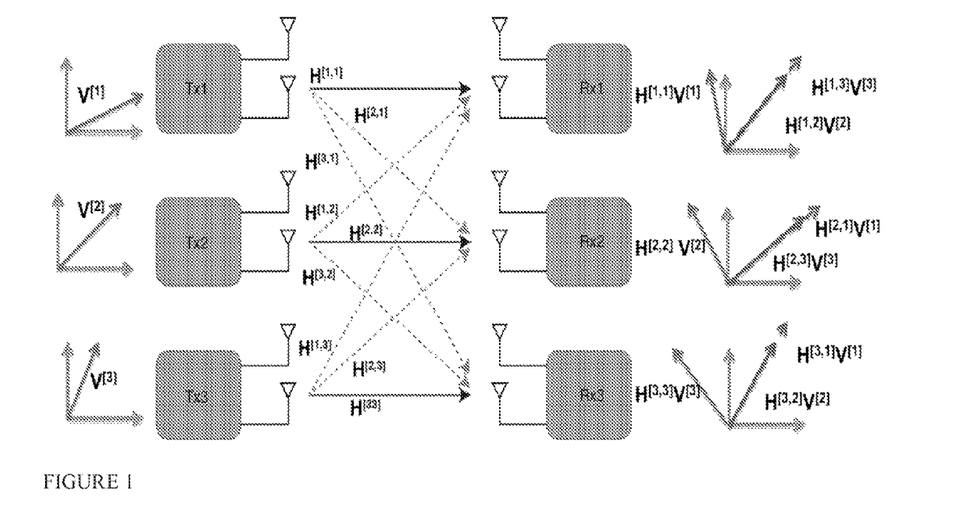
FIG. 1 is a conceptual representation of the precoding, desired signal and interference vectors for the 3 user 2×2 MIMO channel in an exemplary configuration of the invention.

The key insight for IA is that perfect signal recovery is possible if interference does not span the entire received signal space (FIG. 1). As a result, a smaller subspace free of interference can be found where the desired signal can be projected while suppressing the interference to zero. Since the component of the desired signal lying in the interference space is lost after projection, the sum-rate scaling achieved comes at the expense of reduced SNR (see H. Sung, S. Park, K. Lee, and I. Lee, "Linear precoder designs for K-user interference channels," Wireless Communications, IEEE Transactions on, vol. 9, no. 1, pp. 291-301, 2010). Therefore, in order to achieve optimal performance, the two spaces must be roughly orthogonal. However, as the results in O. El Ayach, S. Peters, and R. Heath, "The feasibility of interference alignment over measured MIMO-OFDM channels," Vehicular Technology, IEEE Transactions on, vol. 59, no. 9, pp. 4309-4321, 2010, show, orthogonality (represented in terms of chordal distance) of the subspaces is influenced by the nature of the wireless channel and hence may not always be achievable in the real world. Further, the authors provided a feasibility study of IA over measured channels and established an empirical relation between sum-rate and distance between the signal and interference space. They quantified the effect of correlated channels on the sum capacity and showed the sub-optimality of IA at low SNR. Another experimental study reported in O. Gonzalez, D. Ramirez, I. Santamaria, J. Garcia-Naya, and L. Castedo, "Experimental validation of interference alignment techniques using a multiuser MIMO testbed," in Smart Antennas (WSA), 2011 International ITG Workshop on. IEEE, 2011, pp. 1-8, showed similar degradation in the performance of IA because of practical effects such as collinearity of subspaces arising in real world channels.

On the other hand, reconfigurable antennas have been shown to enhance the performance of MIMO systems by increasing the channel capacity, diversity order and even have been shown to perform well in the low SNR regimes, J. Boerman and J. Bernhard, "Performance study of pattern reconfigurable antennas in MIMO communication systems," Antennas and Propagation, IEEE Transactions on, vol. 56, no. 1, pp. 231-236, 2008; B. Cetiner, H. Jafarkhani, J. Qian, H. Yoo, A. Grau, and F. De Flaviis, "Multifunctional reconfigurable MEMS integrated antennas for adaptive MIMO systems," Communications Magazine, IEEE, vol. 42, no. 12, pp. 62-70, 2004; and A. Sayeed and V. Raghavan, "Maximizing MIMO capacity in sparse multipath with reconfigurable antenna arrays," Selected Topics in Signal Processing, IEEE Journal of, vol. 1, no. 1, pp. 156-166, 2007. The ability of reconfigurable antennas to dynamically alter the radiation patterns and provide multiple channel realizations enable MIMO systems to adapt according to physical link conditions which leads to improved capacity. In the context of IA, reconfigurable antennas have the potential to improve its sum-rate by providing potentially uncorrelated channel realizations.

SUMMARY

The inventors propose to exploit the pattern diversity offered by reconfigurable antennas to achieve an improved sub space design for IA. The performance impact of pattern diversity on interference alignment over wideband MIMO interference channel is evaluated using three user 2×2 MIMO-OFDM channel data. The measurements were accomplished by employing two different architectures of reconfigurable antennas to study the impact of antenna design and characteristics on the performance of IA. An analysis is provided in terms of the improvements achieved in sum capacity, degrees of freedom and distance between interference and desired signal space. Through the experimental results, it is shown that reconfigurable antennas offer additional capacity gains in combination with IA and provide a first step in motivating the use of these antennas for enhancing interference management techniques. Unlike the invention, previous experimental studies on quantifying the performance of IA limit the antenna to be omnidirectional and no experimental study has been conducted for evaluating the performance of reconfigurable antennas in networks using IA for interference management.

In exemplary embodiments of the invention, a system is provided with increased sum capacity for k users, k>1, of an interference network employing interference alignment as the interference management scheme. The system includes a plurality of reconfigurable antennas that offer pattern diversity, the plurality of reconfigurable antennas implementing the interference alignment scheme and being optimized to obtain optimal channel realization. In an exemplary embodiment, the interference network comprises a MIMO OFDM interference network and at least one of the reconfigurable antennas comprises a reconfigurable printed dipole array (RPDA) or a reconfigurable circular patch array (RCPA). The plurality of reconfigurable antennas have multiple antenna states of operation corresponding to multiple radiation patterns at all receivers and transmitters and at least one of the reconfigurable antennas is configured to have an optimal antenna state to enhance total chordal distance between interference and signal subspaces so as to improve sum capacity performance of the interference network. Also, in an exemplary embodiment, at least one of the reconfigurable antennas comprises a closed form interference alignment precoder and another one of the reconfigurable antennas comprises a closed form interference alignment decoder.

Exemplary embodiments of the invention also include a method of increasing the sum capacity for k users, k>1, of an interference network employing interference alignment as the interference management scheme. Such a method includes the steps of transmitting data over an interference channel using a first reconfigurable antenna that offers pattern diversity for interference alignment over the interference channel, optimizing the interference channel between the first reconfigurable antenna and a second reconfigurable antenna to maximize the distance between interference and desired signal space. The optimizing step comprises selecting an optimal antenna state for at least one of the first and second reconfigurable antennas to enhance total chordal distance between interference and signal subspaces so as to improve sum capacity performance of the interference network. Also, in exemplary embodiments, the first or the second reconfigurable antenna precodes data for OFDM transmission using a closed form interference alignment precoder and the second reconfigurable antenna decodes received data using a closed form interference alignment decoder.

BRIEF DESCRIPTION OF THE DRAWINGS

The foregoing and other beneficial features and advantages of the invention will become apparent from the following detailed description in connection with the attached figures, of which.

DETAILED DESCRIPTION OF ILLUSTRATIVE EMBODIMENTS

The present invention may be understood more readily by reference to the following detailed description taken in connection with the accompanying figures and examples, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to methods and software for implementing such methods.

A detailed description of illustrative embodiments of the present invention will now be described with reference to FIGS. 1-10. Although this description provides a detailed example of possible implementations of the present invention, it should be noted that these details are intended to be exemplary and in no way delimit the scope of the invention.

Capital bold letters are used herein to denote matrices and small bold letters for vectors. $H^{-1}$, $H^\dagger$ and $H^T$ denote the matrix inverse, hermitian and transpose operation respectively. Span (H), null (H) and $\|H\|_F$ would represent the space spanned by the columns of H, the null space of H and Frobenius norm of H respectively. The d×d identity matrix is represented by $I_d$.

I. System Model and Interference Alignment

Consider the K user MIMO-OFDM interference channel in which each transmitter (Tx) is equipped with M reconfigurable antennas and each receiver (Rx) is equipped with N reconfigurable antennas. The reconfigurable antennas at the transmitter and receiver have P and Q reconfigurable states respectively. Each of these states correspond to a unique radiation pattern. In such a setting, the received signal at the ith receiver can then be represented by:

$$y^{[i]}(f) = H_{q,p}^{[i,i]}(f)x^{[i]}(f) + \sum_{\substack{k=1 \\ k \neq i}}^{K} H_{q,p}^{[i,k]}(f)x^{[k]}(f) + n(f), \quad (1)$$

where f denotes the OFDM subcarrier index and q, p represent the antenna state selected at the receiver and transmitter respectively, y is the N×1 received column vector, $H_{q,p}^{[i,j]}$ is the N×M MIMO channel between Tx j and Rx i, $x^{[k]}$ is the M×1 input column vector and n represents the N×1 vector of complex zero mean Gaussian noise with the covariance matrix $\mathbb{E}[nn^\dagger]=\sigma^2 I_N$. The total number of data carrying OFDM subcarriers will be represented by $F_S(F_S=52)$. For brevity, we will drop the symbols f, p, and q. Here $x \in \mathbb{C}^{M \times 1}$, $y \in \mathbb{C}^{N \times 1}$ and $H \in \mathbb{C}^{N \times M}$. The input vector x is subject to an average power constraint, $\mathbb{E}[Tr(xx^\dagger)]=P$. Total power is assumed to be equally distributed across the input streams, i.e. the input covariance matrix $$Q = \frac{P}{d_k} I_{d_k},$$

where $d_k$ streams are transmitted by the kth transmitter. Throughout this document, the study is restricted to K=3; M=N=2 and $d_k$=1, $\forall k \in \{1, 2, 3\}$. The space of all the links in the network for all the states of reconfigurable antenna will be represented by the vector $\Omega = \{i_p, j_q\}$, $i,j \in \{1, 2, 3\}$, $p \in P$ and $q \in Q$.

A. Interference Alignment for the 3 User 2×2 MIMO Channel

The goal of IA is to make the signal to interference ratio (SIR) infinite at the output of each receiver. Specifically, if each transmitter transmits D independent streams of information, then to achieve perfect alignment at each receiver, dimensionality of the interference space must be restricted to N−D in a $\mathbb{C}^N$ dimensional receive signal space, S. Jafar, Interference Alignment-A New Look at Signal Dimensions in a Communication Network, 2011. That is, there is a D dimensional subspace in $\mathbb{C}^N$ which is free of interference. The design of the precoding filters for the MIMO interference channel forces interference to exist in a smaller subspace. It has been shown that designing such precoding filters is NP hard for the general MIMO system, M. Razaviyayn, M. Sanjabi Boroujeni, and Z. Luo, "Linear transceiver design for interference alignment: Complexity and computation," in Signal Processing Advances in Wireless Communications (SPAWC), 2010 IEEE Eleventh International Workshop on. IEEE, 2010, pp. 1-5, and a closed form solution exists only for the special case of a three user 2×2 MIMO channel, V. Cadambe and S. Jafar, "Interference alignment and degrees of freedom of the-user interference channel," Information Theory, IEEE Transactions on, vol. 54, no. 8, pp. 3425-3441, 2008.

Let $v^{[i]}$ and $u^{[i]}$ represent the transmit precoder and receive interference suppression filter respectively, where $i \in \{1, 2, 3\}$ and $v^{[i]}, u^{[i]} \in \mathbb{C}^{2 \times 1}$. Moreover, $v^{[i]}$ and $u^{[i]}$ should satisfy the feasibility conditions for IA (C. Yetis, T. Gou, S. Jafar, and A. Kayran, "On feasibility of interference alignment in MIMO interference networks," Signal Processing, IEEE Transactions on, vol. 58, no. 9, pp. 4771-4782, 2010) given by:

$$u^{[k]\dagger} H^{[k,j]} v^{[j]} = 0, \forall j \neq k, \quad (2)$$

$$\text{rank}(u^{[k]\dagger} H^{[k,k]} v^{[k]}) = 1 \quad (3)$$

To avoid adding any additional power in the input symbols, we restrict $v^{[i]}$ and $u^{[i]}$ to be unitary, i.e. $\|v^{[i]}\|_F, \|u^{[i]}\|_F = 1$.

After precoding the input symbol $x^{[i]}$ and $v^{[i]}$, the signal received at the ith receiver can be represented by Equation (4). For perfect alignment at the ith receiver, the interference signal vectors represented by $H^{[i,k]} v^{[k]}$, $k \neq i$ in Equation (4) must span a common subspace of the received signal space. We can then express this alignment condition using the defined interference vectors as Equations (5)-(7).

$$y^{[i]} = H^{[i,i]} v^{[i]} x^{[i]} + \sum_{\substack{k=1 \\ k \neq i}}^{K} H^{[i,k]} v^{[k]} x^{[k]} + n \quad (4)$$

$$\text{span}(H^{[1,2]} v^{[2]}) = \text{span}(H^{[1,3]} v^{[3]}) \quad (5)$$

$$(H^{[2,1]} v^{[1]}) = (H^{[2,3]} v^{[3]}) \quad (6)$$

$$(H^{[3,1]} v^{[1]}) = (H^{[3,2]} v^{[2]}) \quad (7)$$

Closed form solution for the alignment condition expressed in Equations (5)-(7), given the feasibility constraints (2) and (3), can then be found by solving the following eigenvalue problem:

$$\text{span}(v^{[1]}) = \text{span}(E v^{[1]}) \quad (8)$$

$$v^{[2]} = F v^{[1]} \quad (9)$$

$$v^{[3]} = G v^{[1]} \quad (10)$$

$$E = (H^{[3,1]})^{-1} H^{[3,2]} (H^{[1,2]})^{-1} H^{[1,3]} (H^{[2,3]})^{-1} H^{[2,1]} \quad (11)$$

$$F = (H^{[3,2]})^{-1} H^{[3,1]} \quad (12)$$

$$G = (H^{[2,3]})^{-1} H^{[2,1]} \quad (13)$$

$$v^{[1]} = \text{Eigenvec}(E). \quad (14)$$

The ith receiver can suppress all the interference by projecting the received signal of Equation (4) on the orthogonal complement of the interference space of Equation (15), i.e., the interference suppression filter is given by $u^{[i]} = \text{null}([H^{[i,j]} v^{[j]}]^T)$.

$$u^{[i]\dagger} y^{[i]} = u^{[i]\dagger} H^{[i,i]} v^{[i]} x^{[i]} + \sum_{\substack{k=1 \\ k \neq i}}^{K} u^{[i]\dagger} H^{[i,k]} v^{[k]} x^{[k]} + u^{[i]\dagger} n \quad (15)$$

$$= u^{[i]\dagger} H^{[i,i]} v^{[i]} x^{[i]} + u^{[i]\dagger} n \quad (16)$$

Note that $u^{[i]\dagger} H^{[i,i]} v^{[i]}$ acts as the effective SISO channel between Tx/Rx pair (i, i).

II. Experimental Setup

A. Reconfigurable Circular Patch Array (RCPA)

Figure 2:
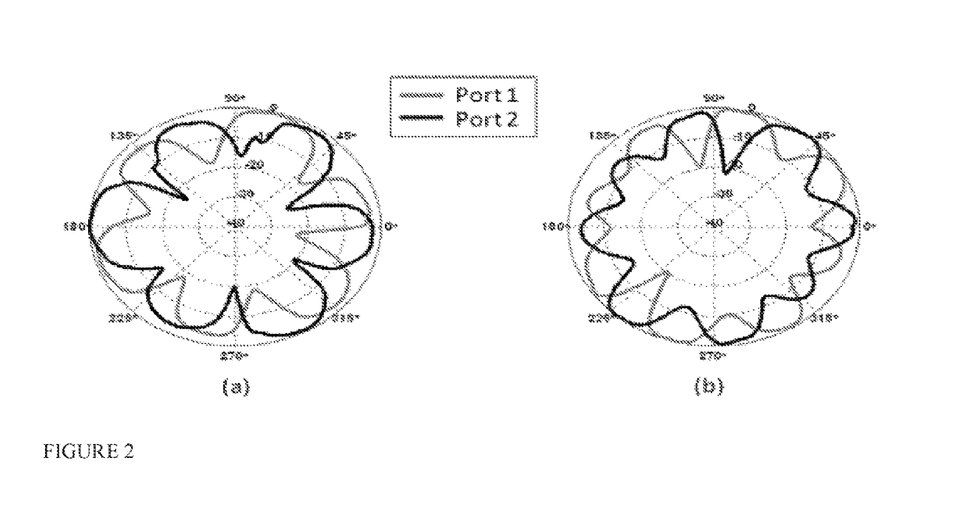
FIG. 2 illustrates RCPA radiation patterns (in dB) in the azimuthal plane at Port 1 and 1. (a) illustrates Port 1: Mode3 and Port 2: Mode3; (b) illustrates Port 1: Mode4 and Port 2: Mode4.

Reconfigurable Circular Patch Antennas (RCPA) (see D. Piazza, P. Mookiah, M. D'Amico, and K. Dandekar, "Experimental analysis of pattern and polarization reconfigurable circular patch antennas for MIMO systems," Vehicular Technology, IEEE Transactions on, vol. 59, no. 5, pp. 2352-2362, 2010) are capable of dynamically changing the shape of their radiation patterns by varying the radius of a circular patch. Each antenna has two feed points and can work as a two element array in a single physical device. By simultaneously turning the switches on or off, the RCPA can generate orthogonal radiation patterns at the two ports. This provides a total of two states of operation (Mode3 and Mode4) providing two unique radiation patterns. Also, the two antenna ports are fed such that the isolation between the two ports is higher than 20 dB. The measured radiation patterns in the azimuthal plane at the two ports of RCPA are shown in FIG. 2.

B. Reconfigurable Printed Dipole Array (RPDA)

Figure 3:
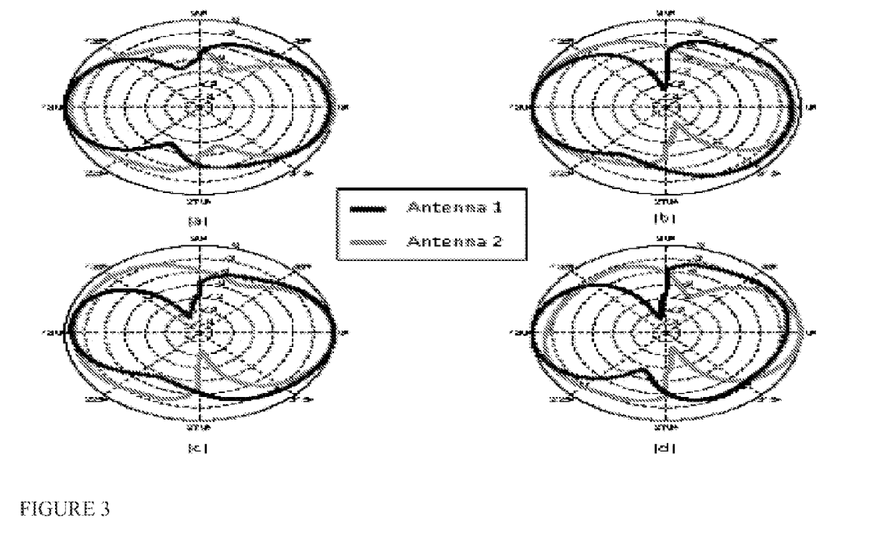
FIG. 3 illustrates RPDA radiation patterns (in dB) in the azimuthal plane with antenna separation of λ/4. (a) illustrates short-short; (b) illustrates long-short; (c) illustrates short-long; and (d) illustrates long-long.
Figure 4:
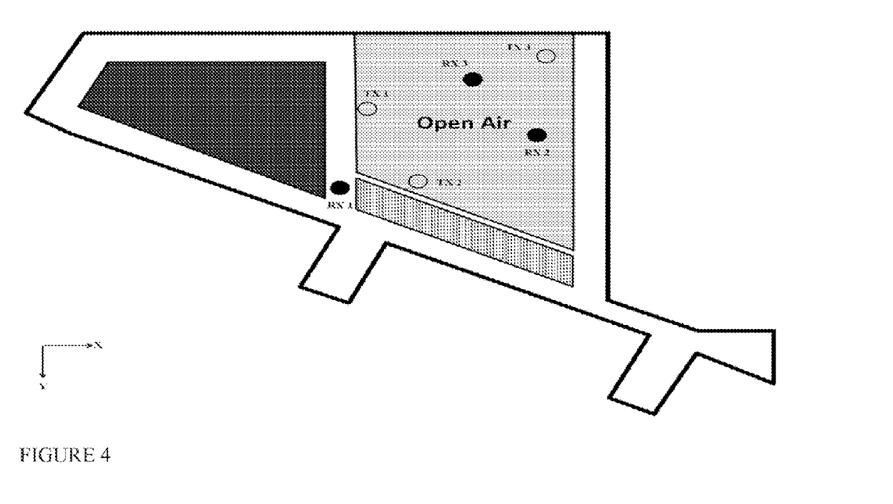
FIG. 4 illustrates a sample 3 user 2×2 MIMO indoor experimental setup.

A second type of pattern reconfigurable antenna used in the experiments is the Reconfigurable Printed Dipole Arrays (RPDA) (D. Piazza, N. Kirsch, A. Forenza, R. Heath, and K. Dandekar, "Design and evaluation of a reconfigurable antenna array for MIMO systems," Antennas and Propagation, IEEE Transactions on, vol. 56, no. 3, pp. 869-881, 2008). In the array configuration, RPDAs are capable of generating multiple radiation patterns by electronically changing the length of the dipole. The multiple radiation patterns shown in FIG. 3 are generated due the varying level of mutual coupling between the elements in the array as the geometry is changed by activating the PIN diodes to change the length of the dipole. The RPDA has four states: short-short, short-long, long-short, and long-long. In the "short" and the "long" configuration, the switch on the antenna is inactive and active respectively.

C. Measurement Setup

For channel measurements, the inventors made use of HYDRA Software Defined Radio platform, K. Mandke, S. Choi, G. Kim, R. Grant, R. Daniels, W. Kim, R. Heath, and S. Nettles, "Early results on HYDRA: A flexible mac/phy multihop testbed," in Vehicular Technology Conference, 2007. VTC2007-Spring. IEEE 65th. IEEE, 2007, pp. 1896-1900, in a 2×2 MIMO setup at 2.4 GHz band using 64 OFDM subcarriers, with 52 data subcarriers. The measurements were conducted on the third floor of the Bossone Research Center in Drexel University in an indoor setup. Three designated receiver nodes and three transmitter nodes were equipped with reconfigurable antenna, with each node equipped with two antenna elements. The network topology shown in FIG. 4 was then used to activate each transmitter-receiver pair to measure the channel response and then the superposition principle was used to recreate an interference-limited network. In order to further capture the small-scale fading effects, the receiver nodes were placed on a robotic antenna positioner and were moved to 40 different locations. Receiver 1 and 2 were moved $\lambda/10$ distance along the y-axis and Receiver 3 was moved $\lambda/10$ distance along the x-axis. For each position and each transmitter-receiver pair, 100 channel snapshots were captured and averaged for each subcarrier. After the completion of the measurement campaign, 240 channel samples were collected for each subcarrier and for each antenna configuration. This entire experiment was repeated for both RCPA and RPDA.

III. Performance Metrics and Evaluation

A. Sum Capacity

Normalization of Channel Values: In order to calculate and compare the sum capacity results from two different set of reconfigurable antenna architectures, the inventors proceeded by forcing the most efficient states of both the antennas to receive equal power. The inventors also removed the effect of path loss to make sure that the capacity gains observed are solely because of the antenna characteristics, J. Kountouriotis, D. Piazza, P. Mookiah, M. DAmico, and K. Dandekar, "Reconfigurable antennas and configuration selection methods for MIMO ad hoc networks," EURASIP Journal on Wireless Communications and Networking, vol. 2011, no. 1, pp. 1-14, 2011. To achieve this, the inventors normalized the channels obtained from both the antennas separately with the normalization factor $\eta$, given as:

$$\eta = _{i,j \in \Omega}^{maxE} \left[ \sum_{f=1}^{F_s} \|H^{[i,j]}(f)\|_F^2 \right], \quad (17)$$

where the expectation was taken over all the 40 measurement locations. The normalized channels are then given by:

$$H_{normalized} = H_{measured} \times \sqrt{\frac{NM \times F_s}{\eta}}. \quad (18)$$

This type of normalization effectively equates the efficiency of the most efficient state of RCPA (Mode3) to the most efficient state of RPDA (short-short). Such an approach also preserves the frequency selective nature of the wireless channel, relative difference in efficiency between states of each antenna and topology of the network.

Ergodic Sum Capacity of the network can then be approximated as described by R. Blum, "MIMO capacity with interference," Selected Areas in Communications, IEEE Journal on, vol. 21, no. 5, pp. 793-801, 2003, by:

$$C_\Sigma = \frac{1}{F_s} \sum_{f=1}^{F_s} \sum_{k=1}^{K} \log_2 \det(I_{d_k} + R^{-1[k]} H_{eff}^{[k,k]} Q^k H_{eff}^{[k,k]\dagger}), \quad (19)$$

where, $$H_{eff}^{[k,k]} = u^{[k]} H^{[k,k]} v^{[k]}, \quad (20)$$

represents the effective channel between kth transmitter-receiver pair and $$R^{[k]} = \sigma^2 u^{[k]} u^{[k]\dagger} + \sum_{\substack{j=1 \\ j \neq k}}^{K} u^{[k]} H^{[k,j]} v^{[j]} Q^{[j]} v^{[j]\dagger} H^{[k,j]\dagger} u^{[k]\dagger}, \quad (21)$$

represents the interference plus noise covariance matrix at the kth receiver.

B. Chordal Distance

It is desirable to keep the signal and interference space roughly orthogonal, as interference suppression leads to the loss of signal component lying in the interference space. This reduces the projection of the desired signal in the interference space resulting in higher sum capacity. Channel realizations corresponding to different states of the antenna, results in varying degree of distance between the interference and signal space. The inventors, therefore, use chordal distance (Equation 22), defined over the Grassmann manifold G(1, 2), D. Love and R. Heath, "Limited feedback unitary precoding for spatial multiplexing systems," Information Theory, IEEE Transactions on, vol. 51, no. 8, pp. 2967-2976, 2005, as the distance metric to quantify performance gains:

$$d(X, Y) = \sqrt{\frac{c_x + c_y}{2} - \|O(X)^\dagger O(Y)\|_F^2}, \quad (22)$$

where $c_x$ denotes the number of columns in matrix X and O(X) denotes the orthonormal basis of X. The sum-rate performance (Equation 19) then becomes a function of the chordal distance between the two spaces. Motivated by H. Sung, S. Park, K. Lee, and I. Lee, "Linear precoder designs for K-user interference channels," Wireless Communications, IEEE Transactions on, vol. 9, no. 1, pp. 291-301, 2010, the inventors define and use the total chordal distance across the 3 users as:

$$D_{total} = d(H^{[1,1]}V^{[1]}, H^{[1,2]}V^{[2]}) + d(H^{[2,2]}V^{[2]}, H^{[2,1]}V^{[1]}) + d(H^{[3,3]}V^{[3]}, H^{[3,1]}V^{[1]}). \quad (23)$$

C. Degrees of Freedom Achieved

The 3 user 2×2 MIMO channel (FIG. 1) can achieve maximum of 3 degrees of freedom (see V. Cadambe and S. Jafar, "Interference alignment and degrees of freedom of the-user interference channel," Information Theory, IEEE Transactions on, vol. 54, no. 8, pp. 3425-3441, 2008), which translates to 3 simultaneous interference free streams. The inventors study the achieved degrees of freedom of IA with and without using reconfigurable antennas and compare the performance in Section IV below. As asymptotically high SNR is not available in practical scenarios, an approximation for degrees of freedom (DoF) (Equation 24) as defined in V. Cadambe and S. Jafar, "Interference alignment and degrees of freedom of the-user interference channel," Information Theory, IEEE Transactions on, vol. 54, no. 8, pp. 3425-3441, 2008, is obtained by performing regression on the SNR v/s sum-rate curve:

$$DoF = \lim_{SNR \to \infty} \frac{C_\Sigma(SNR)}{\log_2(SNR)} \quad (24)$$

IV. Results and Discussion

The inventors evaluated the performance impact of the reconfigurable antennas by using the metrics discussed above and compare the performance of the two antenna architectures in this section. An SNR of 20 dB was maintained for all the nodes in the network which provided sufficient accuracy for the collection of channel samples. The CDF plots were generated using 240 data points collected from 40 different location of transmitter-receiver pair and 6 different topologies of the network. The inventors choose the most efficient operating states of RCPA and RPDA (Mode 3 and short-short respectively) as the substitutes for comparison with non-reconfigurable antennas. The comparison between the two antennas is enabled by using the normalization procedure explained in Section III-A above.

Figure 5:
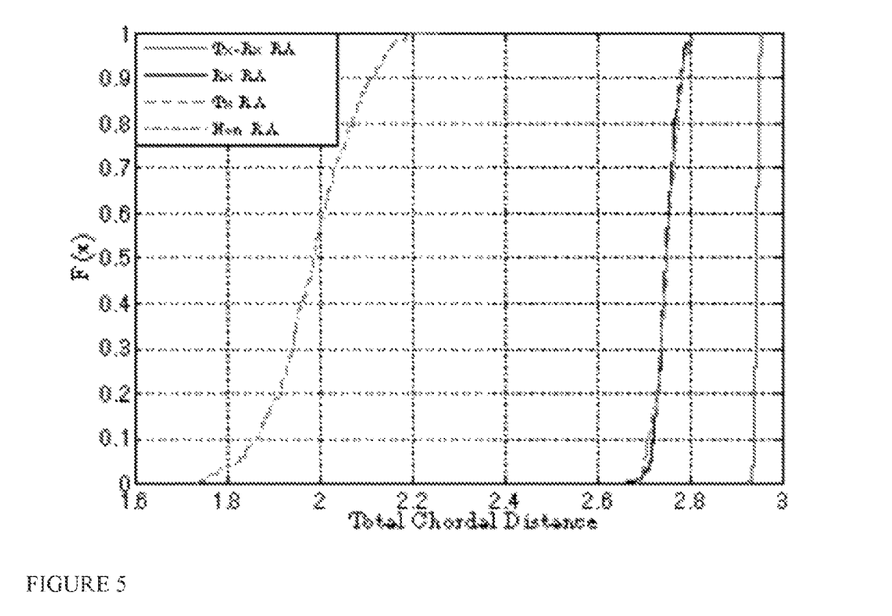
FIG. 5 illustrates CDF of the total chordal distance achieved via RPDA.
Figure 6:
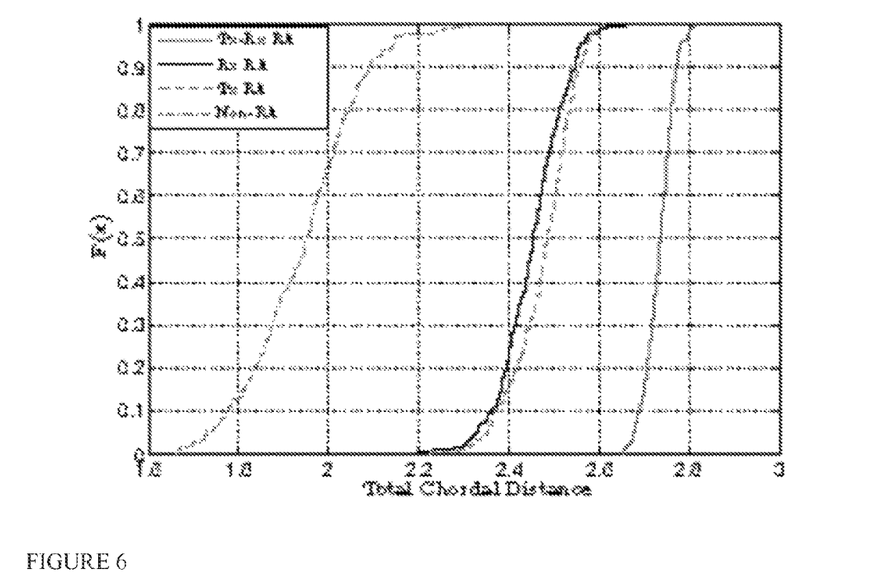
FIG. 6 illustrates CDF of the total chordal distance achieved via RCPA.

In FIG. 5 and FIG. 6, the inventors show the CDF of the total chordal distance for RPDA and RCPA, respectively. It can be observed that IA combined with using reconfigurable antennas significantly enhances the achieved chordal distance. The inventors highlight that RPDA out performs RCPA in terms of percentage improvement, which can be attributed to the greater number of patterns available in RPDA, improving its pattern diversity. Also, the percentage improvement in chordal distance is almost the same for the two scenarios when RCPA is employed at both sides of the link (transmitter-receiver) and RPDA only at one side of the link (transmitter or receiver). This equal improvement is observed because of the equal number of reconfigurable states available in the network for optimal mode selection in both the cases. Summarized results in Table I indicate that the subspaces designed via optimal selection of the antenna state can achieve close to perfect orthogonality and total chordal distance can approach the theoretical maximum value of 3.

TABLE 1

MEAN VALUE OF TOTAL CHORDAL DISTANCE

|  | RCPA | % Increase over Non-RA | RPDA | % Increase over Non-RA |
|---|---|---|---|---|
| IA Non-RA | 1.94 | N/A | 1.99 | N/A |
| IA Tx-R$_x$ RA | 2.73 | 40.72 | 2.94 | 47.74 |
| IA R$_x$ RA | 2.38 | 27.84 | 2.75 | 38.19 |
| IA T$_x$ RA | 2.45 | 26.29 | 2.75 | 38.19 |

Figure 7:
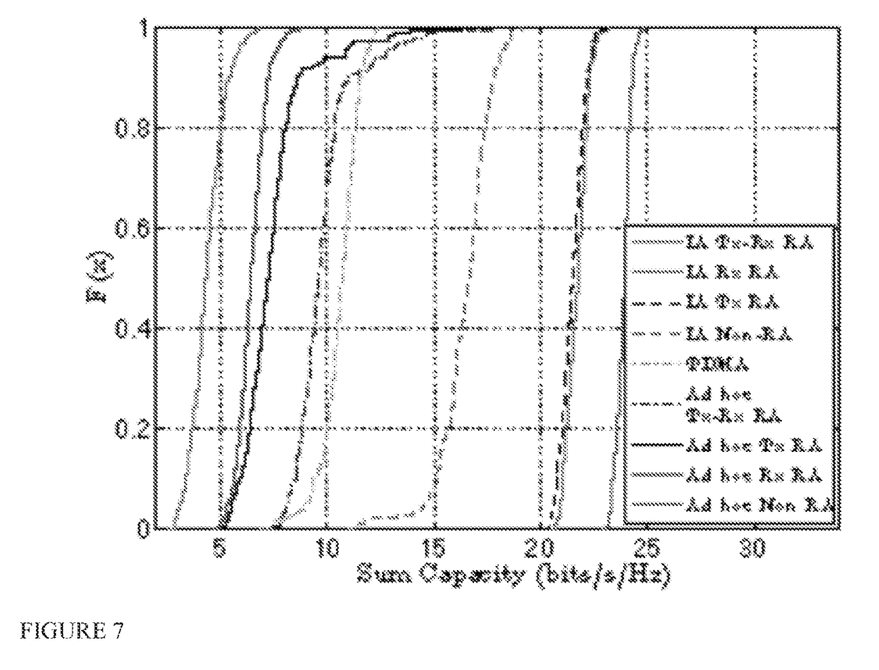
FIG. 7 illustrates an empirical CDF plot of Sum-Capacity for RPDA (SNR=20 dB).
Figure 8:
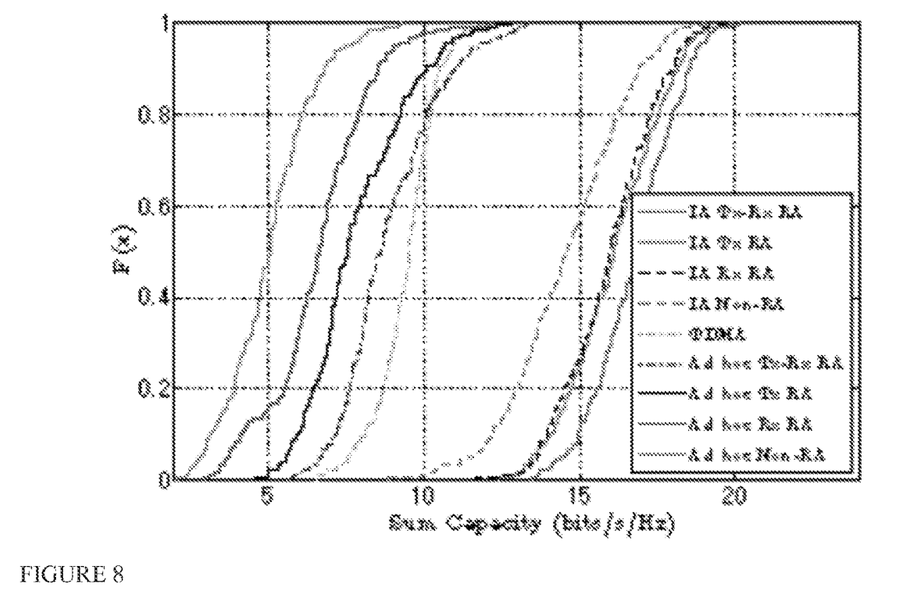
FIG. 8 illustrates an empirical CDF plot of Sum-Capacity for RCPA (SNR=20 dB).

Further, in FIGS. 7 and 8, the inventors study the impact of enhanced chordal distance on the sum capacity performance of IA. Although the inventors observe that adding reconfigurability enhances the sum rate performance of IA, the gains achieved are less prominent for RCPA despite the enhanced chordal distance seen in Table I. This apparent independence of sum-rate and chordal distance performance is observed because chordal distance only exploits the underlying orthonormal space to measure distance, making it insensitive to the relative difference in the efficiency of states of the reconfigurable antennas. Since the states of RPDA have efficiency close to each other, its sum rate performance is better than RCPA. It can be observed that, for both RPDA and RCPA, the performance of transmitter and receiver side configuration are similar since the chordal distance obtained are also quite similar. Similar performance in terms of sum-rate shows that given equal efficiency chordal distance is closely related to sum rate performance.

The inventors observe performance gains of the order of 45% and 15% (at 20 dB SNR) over non-reconfigurable antennas respectively with RPDA and RCPA employed at both transmitter and receiver. The inventors also compare IA to other transmit strategies such as TDMA, networks using no interference avoidance strategy (Ad hoc) with and without reconfigurable antennas and observe that, as predicted in theory, IA outperforms them all.

Figure 9:
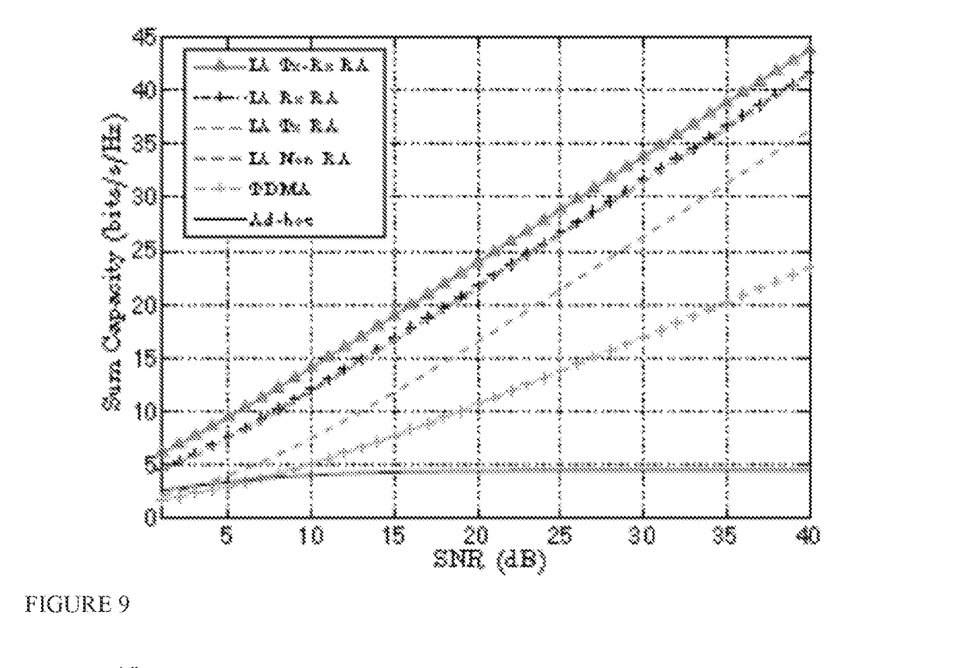
FIG. 9 illustrates Sum-Rate versus SNR for RPDA.
Figure 10:
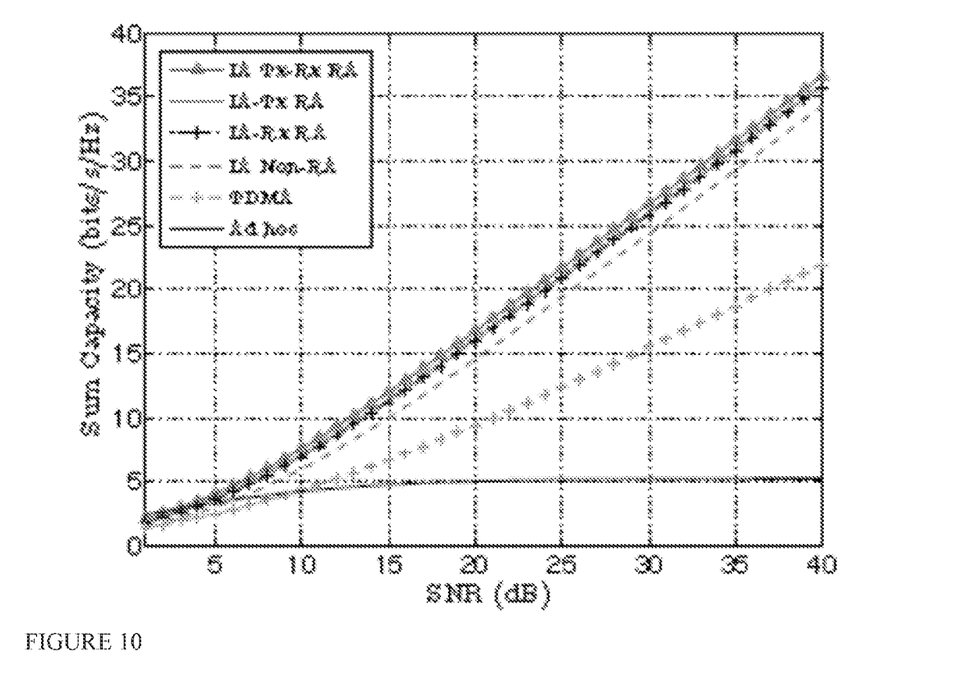
FIG. 10 illustrates Sum-Rate versus SNR for RCPA.

In FIGS. 9 and 10, the inventors show the sum capacity in different SNR regimes. The plots illustrate that maximum sum capacity is achieved by IA with full reconfigurability at both transmitter and receiver. The marginal gains realized because of increased chordal distance are more prominent in the low SNR region since non-orthogonal spaces degrade the performance of IA in that regime (See O. El Ayach, S. Peters, and R. Heath, "The feasibility of interference alignment over measured MIMO-OFDM channels," Vehicular Technology, IEEE Transactions on, vol. 59, no. 9, pp. 4309-4321, 2010, and O. Gonzalez, D. Ramirez, I. Santamaria, J. Garcia-Naya, and L. Castedo, "Experimental validation of interference alignment techniques using a multiuser MIMO testbed," in Smart Antennas (WSA), 2011 International ITG Workshop on. IEEE, 2011, pp. 1-8). As more reconfigurable states are added to the network, increasing gains in sum capacity are observed.

TABLE II

DEGREES OF FREEDOM (DoF) ACHIEVED

|  | RCPA | RPDA |
|---|---|---|
| TDMA | 1.64 | 1.74 |
| IA Non-RA | 2.65 | 2.74 |
| IA Tx-Rx-RA | 2.77 | 2.95 |
| TX Rx-RA | 2.74 | 2.90 |
| TX Tx-RA | 2.73 | 2.90 |

Characterizing DoF from the slopes of the traces in FIGS. 9 and 10 reveals that using IA with reconfigurable antennas can improve the achieved DoF while increasing the sum rate at the same time. The achieved DoF are summarized in Table II. For the three user 2×2 MIMO system, a maximum of 3 DoF can be achieved. With RPDA at both transmitter and receiver the inventors were able to achieve close to 2.94 as compared to 2.74 with non-reconfigurable structures. Additionally, it can be seen that TDMA achieved only a max of 1.74 as compared to 2.94 achieved by IA. Therefore, the inventors' measurements also show that IA performs better than TDMA under realistic channels and its performance can further be enhanced using reconfigurable antennas.

V. Conclusion

The inventors have shown that reconfigurable antennas can significantly enhance the performance of IA by enabling an additional degree of freedom for optimal channel state selection. The inventors quantify the effect of pattern diversity on enhanced chordal distance and the sum rate performance of the network. The results from measured channel data show the feasibility of using reconfigurable antennas for enhancing interference management techniques such as IA. As described by the present inventors in N. Gulati, D. Gonzalez, and K. Dandekar, "Learning algorithm for reconfigurable antenna state selection," in IEEE Radio and Wireless Symposium. IEEE, 2012, and by D. Piazza, J. Kountouriotis, M. D'Amico, and K. Dandekar, "A technique for antenna configuration selection for reconfigurable circular patch arrays," Wireless Communications, IEEE Transactions on, vol. 8, no. 3, pp. 1456-1467, 2009, integrating and extending existing state selection techniques is essential for real-time operation.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed:

1. A system with increased sum capacity for k users, k>1, of an interference network employing interference alignment as the interference management scheme, said system comprising a plurality of reconfigurable antennas that offer pattern diversity, said plurality of reconfigurable antennas implementing said interference alignment scheme, wherein an interference channel between a first reconfigurable antenna and a second reconfigurable antenna is optimized to maximize a distance between interference and desired signal space.

2. The system of claim 1, wherein the interference network comprises a MIMO OFDM interference network.

3. The system of claim 1, wherein at least one of said reconfigurable antennas comprises a reconfigurable printed dipole array (RPDA).

4. The system of claim 1, wherein at least one of said reconfigurable antennas comprises a reconfigurable circular patch array (RCPA).

5. The system of claim 1, wherein said plurality of reconfigurable antennas have multiple antenna states of operation corresponding to multiple radiation patterns at all receivers and transmitters and at least one of said reconfigurable antennas is configured to have an optimal antenna state to enhance total chordal distance between interference and signal subspaces so as to improve sum capacity performance of the interference network.

6. The system of claim 1, wherein at least one of said reconfigurable antennas comprises a closed form interference alignment precoder and another one of said reconfigurable antennas comprises a closed form interference alignment decoder.

7. A method of increasing the sum capacity for k users, k>1, of an interference network employing interference alignment as the interference management scheme, comprising the steps of:
transmitting data over an interference channel using a first reconfigurable antenna that offers pattern diversity for interference alignment over the interference channel; and
optimizing the interference channel between said first reconfigurable antenna and a second reconfigurable antenna to maximize the distance between interference and desired signal space.

8. The method of claim 7, wherein the interference network comprises a MIMO OFDM interference network and transmitting data over an interference channel comprises transmitting data over an interference channel of said MIMO OFDM interference network.

9. The method of claim 7, wherein said optimizing step comprises selecting an optimal antenna state for at least one of said first and second reconfigurable antennas to enhance total chordal distance between interference and signal subspaces so as to improve sum capacity performance of the interference network.

10. The method of claim 7, further comprising one of said first and second reconfigurable antennas precoding data for OFDM transmission using a closed form interference alignment precoder and said second reconfigurable antenna decoding received data using a closed form interference alignment decoder.

* * * * *